US010137892B2

(12) United States Patent
Koravadi

(10) Patent No.: US 10,137,892 B2
(45) Date of Patent: *Nov. 27, 2018

(54) VEHICLE MONITORING SYSTEM

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,436

(22) Filed: Nov. 18, 2016

(65) Prior Publication Data

US 2017/0066440 A1    Mar. 9, 2017

Related U.S. Application Data

(63) Continuation of application No. 14/561,794, filed on Dec. 5, 2014, now Pat. No. 9,499,139.

(60) Provisional application No. 62/047,194, filed on Sep. 8, 2014, provisional application No. 61/912,146, filed on Dec. 5, 2013.

(51) Int. Cl.
| | |
|---|---|
| *B60T 7/12* | (2006.01) |
| *B60W 30/09* | (2012.01) |
| *B62D 15/02* | (2006.01) |
| *B60T 7/18* | (2006.01) |
| *G08G 1/16* | (2006.01) |

(52) U.S. Cl.
CPC ............... *B60W 30/09* (2013.01); *B60T 7/12* (2013.01); *B60T 7/18* (2013.01); *B62D 15/029* (2013.01); *G08G 1/164* (2013.01)

(58) Field of Classification Search
CPC .......... B60T 7/12; B60T 7/18; B62D 15/029; G08G 1/164; B60W 30/09
USPC ........................................................ 701/23
See application file for complete search history.

(56) References Cited

U.S. PATENT DOCUMENTS

| | | | |
|---|---|---|---|
| 5,386,285 | A | 1/1995 | Asayama |
| 5,394,333 | A | 2/1995 | Kao |
| 5,406,395 | A | 4/1995 | Wilson et al. |
| 5,410,346 | A | 4/1995 | Saneyoshi et al. |
| 5,414,257 | A | 5/1995 | Stanton |
| 5,414,461 | A | 5/1995 | Kishi et al. |

(Continued)

*Primary Examiner* — Atul Trivedi
(74) *Attorney, Agent, or Firm* — Honigman Miller Schwartz and Cohn, LLP

(57) ABSTRACT

A vehicle monitoring system includes a central processor operable to receive data from multiple vehicles, with each of the multiple vehicles being equipped with a plurality of vision sensors, a plurality of non-vision sensors, and an ECU. The central processor is operable to wirelessly receive, from each of the multiple vehicles, vehicle data and environment data. Responsive to vehicle data and environment data received from the multiple vehicles, the central processor determines if one or more of the vehicles is at or approaching a hazardous condition. Responsive to the determination that one or more of the vehicles is a threatened vehicle at a potentially hazardous condition, the central monitoring system at least one of (i) actuates an alert of the threatened vehicle to alert a driver of that vehicle of the determined hazardous condition and (ii) controls a vehicle system of the threatened vehicle to mitigate the determined hazardous condition.

25 Claims, 5 Drawing Sheets

(56) References Cited

U.S. PATENT DOCUMENTS

| | | |
|---|---|---|
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,341,523 B2 | 1/2002 | Lynam |
| 6,370,329 B1 | 4/2002 | Teuchert |
| 6,392,315 B1 | 5/2002 | Jones et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,516,664 B2 | 2/2003 | Lynam |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,819,231 B2 | 11/2004 | Berberich et al. |
| 6,822,563 B2 | 11/2004 | Bos et al. |
| 6,823,241 B2 | 11/2004 | Shirato |
| 6,824,281 B2 | 11/2004 | Schofield |
| 6,850,156 B2 | 2/2005 | Bloomfield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield |
| 6,968,736 B2 | 11/2005 | Lynam |
| 6,975,775 B2 | 12/2005 | Rykowski et al. |

(56) References Cited

U.S. PATENT DOCUMENTS

| | | |
|---|---|---|
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,338,177 B2 | 3/2008 | Lynam |
| 7,355,524 B2 | 4/2008 | Schofield |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,425,076 B2 | 9/2008 | Schofield et al. |
| 7,446,650 B2 | 11/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,580,795 B2 | 8/2009 | McCarthy et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 7,979,172 B2 | 7/2011 | Breed |
| 8,013,780 B2 | 9/2011 | Lynam et al. |
| 8,027,029 B2 | 9/2011 | Lu et al. |
| 8,058,977 B2 | 11/2011 | Lynam |
| 8,248,223 B2 | 8/2012 | Periwal |
| 8,340,866 B2 | 12/2012 | Hanzawa et al. |
| 8,457,827 B1 | 6/2013 | Ferguson |
| 8,466,806 B2 | 6/2013 | Schofield |
| 8,521,352 B1 | 8/2013 | Ferguson et al. |
| 8,532,862 B2 | 9/2013 | Neff |
| 8,694,224 B2 | 4/2014 | Chundrlik, Jr. et al. |
| 8,849,495 B2 | 9/2014 | Chundrlik, Jr. et al. |
| 9,007,197 B2 | 4/2015 | Breed |
| 9,008,369 B2 | 4/2015 | Schofield et al. |
| 9,195,914 B2 | 11/2015 | Fairfield |
| 9,317,983 B2* | 4/2016 | Ricci ............... H04W 4/21 |
| 9,318,023 B2* | 4/2016 | Moshchuk ......... G08G 1/167 |
| 9,499,139 B2 | 11/2016 | Koravadi |
| 9,612,123 B1* | 4/2017 | Levinson ........... G01C 21/32 |
| 9,916,703 B2* | 3/2018 | Levinson ........... B60Q 1/26 |
| 9,958,864 B2* | 5/2018 | Kentley-Klay ..... G01C 21/26 |
| 2002/0015153 A1 | 2/2002 | Downs |
| 2002/0044065 A1 | 4/2002 | Quist et al. |
| 2002/0105423 A1 | 8/2002 | Rast |
| 2002/0113873 A1 | 8/2002 | Williams |
| 2002/0121132 A1* | 9/2002 | Breed ............... B60C 11/24 73/146 |
| 2002/0159270 A1 | 10/2002 | Lynam et al. |
| 2003/0137586 A1 | 7/2003 | Lewellen |
| 2003/0158635 A1 | 8/2003 | Pillar et al. |
| 2003/0209893 A1* | 11/2003 | Breed ............... B60J 10/00 280/735 |
| 2003/0222982 A1 | 12/2003 | Hamdan et al. |
| 2004/0114381 A1 | 6/2004 | Salmeen et al. |
| 2004/0181338 A1 | 9/2004 | Dobler et al. |
| 2006/0018511 A1 | 1/2006 | Stam et al. |
| 2006/0018512 A1 | 1/2006 | Stam et al. |
| 2006/0025897 A1* | 2/2006 | Shostak ............ B60C 23/005 701/1 |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0290479 A1 | 12/2006 | Akatsuka et al. |
| 2007/0021915 A1 | 1/2007 | Breed |
| 2007/0027583 A1 | 2/2007 | Tamir |
| 2007/0075919 A1* | 4/2007 | Breed ............... B60R 21/013 345/8 |
| 2007/0104476 A1 | 5/2007 | Yasutomi et al. |
| 2007/0109111 A1 | 5/2007 | Breed |
| 2007/0152804 A1 | 7/2007 | Breed |
| 2007/0205881 A1* | 9/2007 | Breed ............... B60C 23/041 340/447 |
| 2008/0150786 A1 | 6/2008 | Breed |
| 2008/0161986 A1 | 7/2008 | Breed |
| 2008/0161987 A1 | 7/2008 | Breed |
| 2008/0180529 A1 | 7/2008 | Taylor et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0063663 A1 | 3/2010 | Tolstedt et al. |
| 2010/0063680 A1 | 3/2010 | Tolstedt et al. |
| 2010/0082195 A1 | 4/2010 | Lee et al. |
| 2010/0097469 A1 | 4/2010 | Blank et al. |
| 2010/0228437 A1 | 9/2010 | Hanzawa et al. |
| 2011/0015818 A1* | 1/2011 | Breuer ............... B60T 8/17558 701/31.4 |
| 2011/0160964 A1 | 6/2011 | Obradovich |
| 2011/0213628 A1 | 9/2011 | Peak et al. |
| 2012/0041632 A1 | 2/2012 | Garcia Bordes |
| 2012/0062743 A1 | 3/2012 | Lynam et al. |
| 2012/0083959 A1 | 4/2012 | Dolgov |
| 2012/0083960 A1* | 4/2012 | Zhu ............... G05D 1/0055 701/23 |
| 2012/0123806 A1 | 5/2012 | Schumann, Jr. et al. |
| 2012/0218412 A1 | 8/2012 | Dellantoni et al. |
| 2012/0262340 A1 | 10/2012 | Hassan et al. |
| 2013/0030657 A1* | 1/2013 | Chatterjee ......... B60W 50/08 701/46 |
| 2013/0052614 A1* | 2/2013 | Mollicone ......... G09B 19/167 434/65 |
| 2013/0054103 A1 | 2/2013 | Herink |
| 2013/0124052 A1 | 5/2013 | Hahne |
| 2013/0131907 A1* | 5/2013 | Green ............... G05D 1/0055 701/23 |
| 2013/0131918 A1 | 5/2013 | Hahne |
| 2013/0144490 A1 | 6/2013 | Lord |
| 2013/0201316 A1* | 8/2013 | Binder ............... H04L 67/12 348/77 |
| 2013/0218396 A1* | 8/2013 | Moshchuk ......... B60W 50/08 701/25 |
| 2013/0222592 A1 | 8/2013 | Gieseke et al. |
| 2013/0226408 A1 | 8/2013 | Fung |
| 2013/0231825 A1 | 9/2013 | Chundrlik, Jr. |
| 2013/0342333 A1 | 12/2013 | Hutchings |
| 2014/0067206 A1 | 3/2014 | Pflug |
| 2014/0104051 A1 | 4/2014 | Breed |
| 2014/0218529 A1 | 8/2014 | Mahmoud et al. |
| 2014/0257659 A1 | 9/2014 | Dariush |
| 2014/0309806 A1* | 10/2014 | Ricci ............... B60Q 1/00 701/1 |
| 2014/0309884 A1 | 10/2014 | Wolf |

(56) References Cited

U.S. PATENT DOCUMENTS

| | | |
|---|---|---|
| 2014/0309885 A1 | 10/2014 | Ricci |
| 2014/0375476 A1 | 12/2014 | Johnson et al. |
| 2015/0158499 A1* | 6/2015 | Koravadi ............... B60T 7/12 |
| | | 701/23 |
| 2016/0068103 A1 | 3/2016 | McNew et al. |
| 2016/0086391 A1* | 3/2016 | Ricci ..................... G07C 5/008 |
| | | 701/29.3 |
| 2017/0101056 A1* | 4/2017 | Park ..................... B60Q 9/008 |
| 2017/0305418 A1* | 10/2017 | Bae ................... B60W 50/0098 |
| 2018/0082589 A1* | 3/2018 | Park ........................ G06T 7/70 |

* cited by examiner

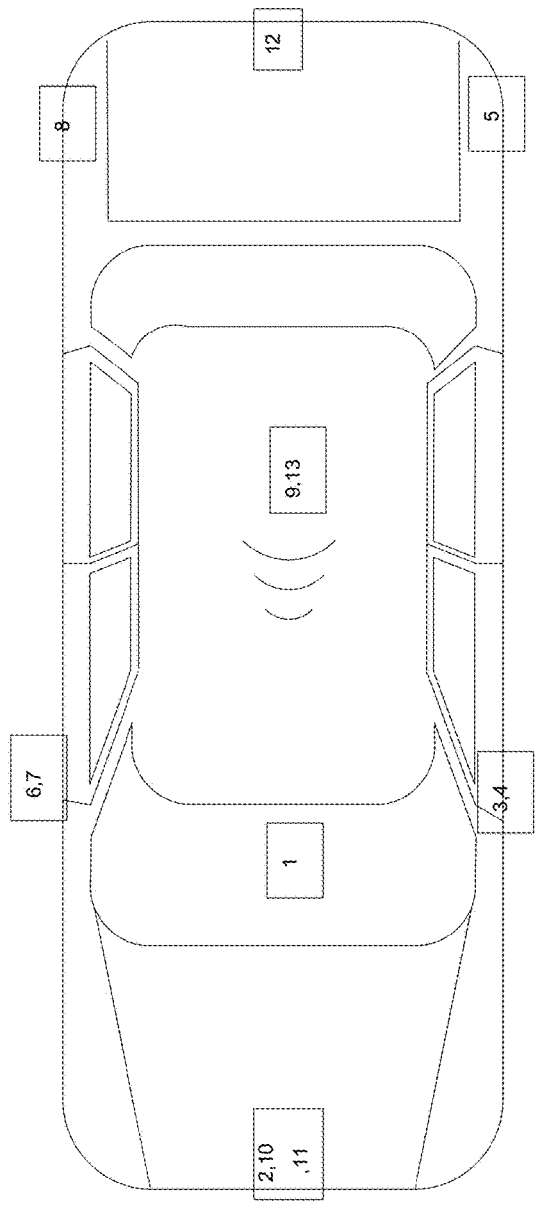

FIG. 4

1- Wind shield mounted camera with night vision capability
2- long range radar
3- ultra wide angle lens surround view left camera
4- long range lane change & blind spot detection left radar
5- long range lane change & blind spot detection left camera
6- ultra wide angle lens surround view right camera
7- long range lane change & blind spot detection right radar
8- long range lane change & blind spot detection right camera
9- V2X radio
10- long range front LIDAR sensor
11- ultra wide angle lens surround view front camera
12- ultra wide angle lens surround view backup camera
13- GPS enabled e-Horizon

| Sensor | FL | FS | LSR | RSR | BSR | BLR |
|---|---|---|---|---|---|---|
| 1 | x | x | | | | |
| 2 | x | x | | | | |
| 3,6,11,12 | | x | x | x | x | |
| 10 | | x | | | | |
| 5,8 | | | x | x | | x |
| 4,7 | | | x | x | x | x |
| 9 | x | x | x | x | x | x |

Sensor coverage area:

| | | |
|---|---|---|
| FL | Front long range | (<140m) |
| FS | Front short range | (<30 m) |
| LSR | Left short range | (<15-20 m) |
| RSR | Right short range | (<15-20 m) |
| BSR | Back short range | (<15-20 m) |
| BLR | Back long range | (<70-130 m) |

FIG. 5

VEHICLE MONITORING SYSTEM

CROSS REFERENCE TO RELATED APPLICATIONS

The present application is a continuation of U.S. patent application Ser. No. 14/561,794, filed Dec. 5, 2014, now U.S. Pat. No. 9,499,139, which claims the filing benefits of U.S. provisional application Ser. No. 62/047,194, filed Sep. 8, 2014, and Ser. No. 61/912,146, filed Dec. 5, 2013, which are hereby incorporated herein by reference in their entireties.

FIELD OF THE INVENTION

The present invention relates generally to a sensor system for a vehicle and, more particularly, to vehicle sensor systems that are linked to a central monitoring system.

BACKGROUND OF THE INVENTION

Communication systems for vehicles may provide for communication between vehicles and/or between a vehicle and a remote server. Examples of such systems are described in U.S. Pat. No. 7,580,795, which is hereby incorporated herein by reference in its entirety.

SUMMARY OF THE INVENTION

The present invention provides a central monitoring system that receives inputs from vehicles (such as autonomous or semi-autonomous vehicles) travelling on a road and inputs indicative of the environment surrounding the vehicle or vehicles and that communicates with a subject or monitored vehicle (automated or semi-automated driven) and other surrounding vehicles in real-time to provide an additional level of fault tolerance to the monitored vehicle travelling on a road. Responsive to the inputs, the central monitoring system determines if the monitored vehicle or vehicles are at or approaching a hazardous condition. When it is determined that the monitored vehicle or vehicles are in or at or approaching a potentially hazardous condition, the central monitoring system actuates an alert of the vehicle to alert the driver or occupant of the hazard and/or actuates or controls a vehicle system (such as a brake system or steering system or collision avoidance system of the vehicle) to avoid or minimize the risk of the hazardous situation. The vehicles communicate with the central monitoring systems via a wireless network or link, such as a 3G/4G network, V2X communication system or high speed network. The system of the present invention also provides fault tolerant and reconfigurable system architecture for an automated vehicle that communicates with the central monitoring system via a high speed redundant communication link to improve the reliability and availability of the system to meet level 3 and level 4 of automated driving with very little or no human intervention.

These and other objects, advantages, purposes and features of the present invention will become apparent upon review of the following specification in conjunction with the drawings.

BRIEF DESCRIPTION OF THE DRAWINGS

FIG. 4 is a diverse redundancy sensor configuration in accordance with the present invention; and FIG. 5 is a chart showing the sensor coverage areas of the vehicle sensors of the sensor configuration shown in FIG. 4.

DESCRIPTION OF THE PREFERRED EMBODIMENTS

Figure 1:
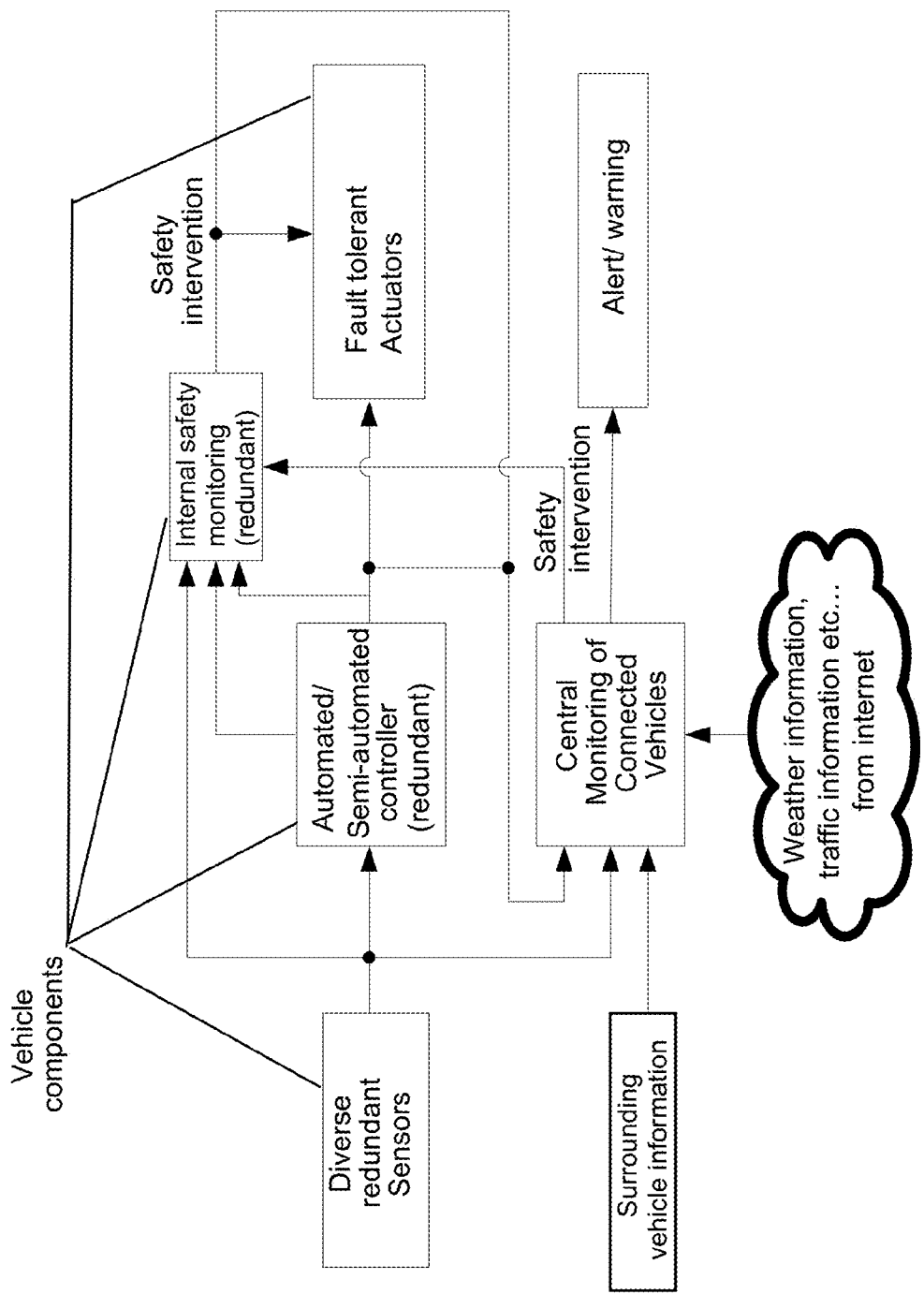
FIG. 1 is a schematic of a vehicle and central monitoring system in accordance with the present invention.

A vehicle sensor system and/or driver assist system and/or alert system operates to communicate vehicle information to a central monitoring system, which receives information pertaining to the environment at or surrounding the equipped vehicle or vehicles that are linked to the central monitoring system (FIG. 1). The vehicle-based components may include one or more sensors, an automated or semi-automated controller, an internal safety monitoring system, one or more fault tolerant actuators (such as actuators of various vehicle systems, such as brake systems, steering systems and/or the like) and one or more alert/warning systems. The central monitoring system may receive an input from the vehicle controller or sensors or the like, and may receive an input from another source (that may provide information from other vehicles at or near the subject or monitored vehicle) and may receive an input pertaining to weather information, traffic information and/or the like, such as from the internet or the like. Responsive to the inputs, the central monitoring system may control or communicate a signal to control the actuators or the alert/warning system of the vehicle, such as when the inputs are indicative of the vehicle being in or approaching a hazardous condition or the like. The monitoring and alert/control system of the present invention may utilize aspects of the systems described in U.S. Publication Nos. US 2012-0218412, published Aug. 30, 2012, US 2012-0002743, published Mar. 15, 2012, and/or US 2013-0222592, published Aug. 29, 2013, which are hereby incorporated herein by reference in their entireties.

As the automotive industry is moving towards automated and semi-automated vehicle technology as well as high speed connectivity, it is important to have an additional real-time safety monitoring system in place so that it a system is provided for an additional external monitoring of the vehicles and is operable to take necessary safety actions in case of system malfunction.

Figure 2:
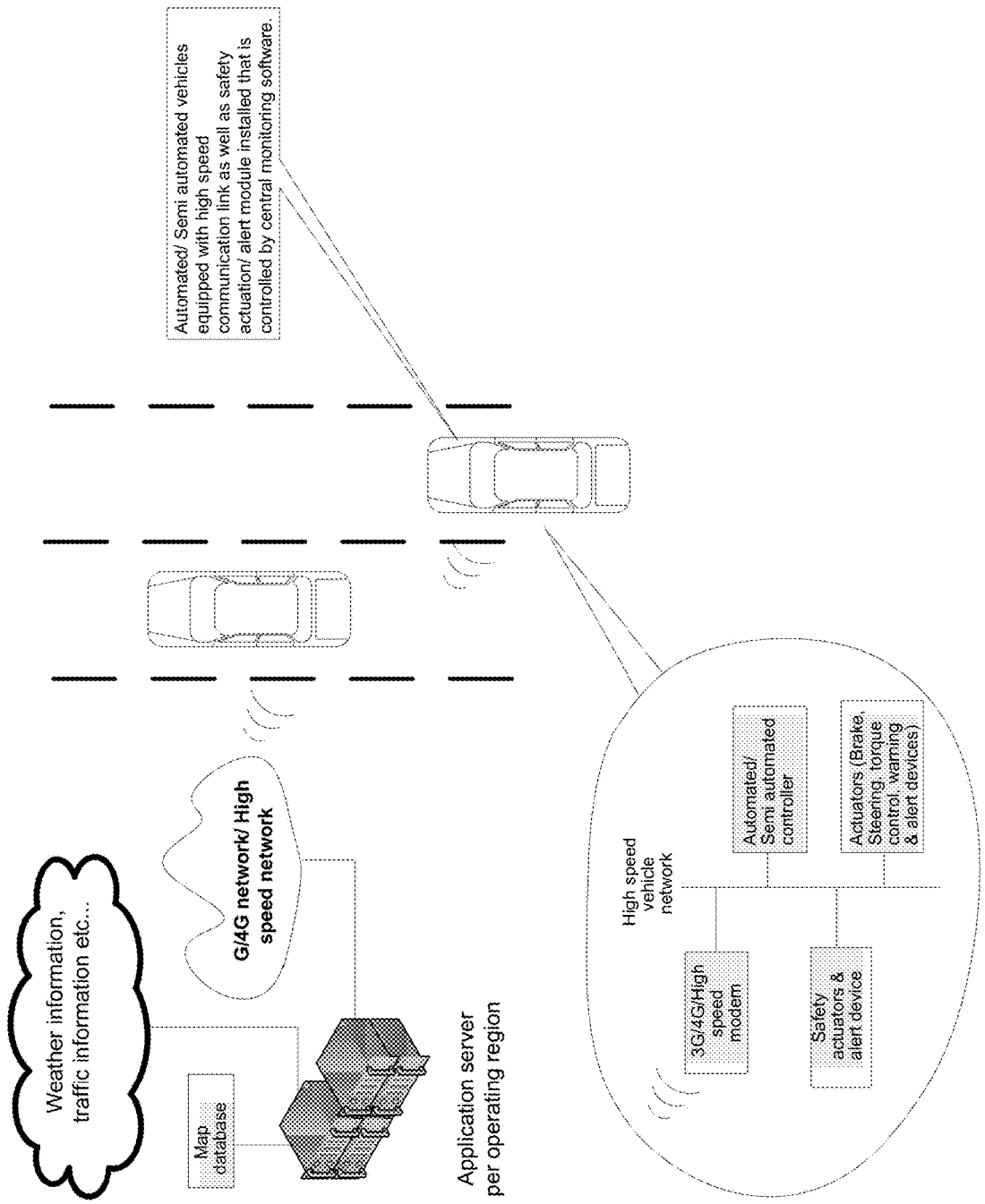
FIG. 2 is a schematic showing operation of the central monitoring system of the present invention.

In the illustrated embodiment of FIG. 2, equipped vehicles communicate with the central monitoring system, which monitors the vehicle behavior in real time along with environment information (map database information, traffic information, weather condition information). Responsive to a determination that one of the vehicles being monitored is at or approaching a threat or hazardous condition (such as a traffic jam or accident or hazardous weather conditions or the like), the system controls and commands the safety actuators installed in the threatened vehicle or vehicles so that the driver of the vehicle or vehicles are alerted to the hazard and/or so that the vehicle is controlled and takes safety action (such as via control of a collision avoidance system or the like of the vehicle).

As can be seen with reference to FIG. 2, during operation, all of the vehicles being monitored will transmit the safety critical parameters in real time using a secure high speed network. Such safety critical parameters may include, for example, vehicle longitudinal velocity, lateral velocity, longitudinal acceleration, lateral acceleration, intent to change lane (such as responsive to actuation of a turn signal indicator), system breakdown, location information (such as responsive to a GPS system or the like), lane information (such as responsive to a vision-based system of the vehicle or the like), objects and lane information determined by diverse redundancy sensors and/or the like.

A central server receives the signals from the vehicles. The central server has a monitoring software running in real time and monitoring the all the vehicles, with all connected vehicle data and map data base, traffic information, weather condition information and/or the like. The central server has a powerful computation capability and is operable to process the real time data from all the connected vehicles map data base, traffic information, weather condition information and the like. The central server is operable to monitor all of the connected or linked vehicles.

In the event of the automated/semi-automated vehicle's malfunction, the central monitoring software will have all the information about the environment at which the vehicle is travelling. Thus, the central server may control or command the safety alert/actuators installed in the vehicle or vehicles that may be in danger to alert the driver of that vehicle or vehicles or to control one or more vehicle systems of that vehicle or vehicles to take necessary safety action, such as to take a different route to avoid an accident or dangerous or extreme weather conditions or the like.

The monitored vehicle may comprise an automated or autonomous or semi-automated vehicle equipped with a high speed communication link as well as a safety actuation/alert module, which is controlled by central monitoring software.

The vehicles communicate with the central monitoring systems via a wireless network or link, such as a 3G/4G network or high speed network. The network may include a 3G/4G/High speed modem, which may be linked to the automated or semi-automated controller and the safety actuators and alert device of the vehicle and the actuators, such as for controlling the vehicle brakes, vehicle steering, torque control, warning and alert devices of the vehicle.

The present invention has a significant potential in external safety monitoring system for automated and semi-automated vehicles.

Optionally, the present invention may provide fault tolerant and reconfigurable system architecture for autonomous vehicles. As autonomous vehicle are becoming reality, it is important to come up with fault tolerant reconfigurable system architecture to meet level 3 and level 4 of autonomy with very little or no human intervention.

For example, an autonomous vehicle may be equipped with diverse redundancy sensors to detect the environment in which vehicle is operated (or may be responsive to communications from other transmitters or devices or components or systems, such as devices of vehicle to infrastructure (v2x) communication systems or vehicle to vehicle (v2v) communication systems or the like). Diverse redundancy provides good tolerance to common cause failure and also improves the availability of the system. Diverse redundancy sensors (such as shown in FIG. 4) may include (a) a long range radar and a long range windshield camera with night vision capability (see [1], [2] and [11] in FIG. 4), which detect and classify the long distance object in front of the vehicle, (b) a long range lane change and a blind spot detection left camera and radar (see [4] and [5] in FIG. 4) and right camera and radar (see [7] and [8] in FIG. 4), which detect and classify the long distance object at the sides and back of the vehicle, (c) a v2x (and/or v2v) radio (see [9] in FIG. 4), which provides the real time information of the connected vehicles around the equipped vehicle, which is a diverse redundancy of data extracted via vision or RADAR/LIDAR sensor and/or (d) a GPS enabled e-Horizon module [13], which provides information on speed limit, exit and entry ramp location, curvature information, number of lanes and the like, which is a diverse redundancy of data extracted via vision or radar sensor. As shown in FIG. 5, the coverage area around the vehicle may have front long range area of less than about 140 meters ahead of the vehicle and a front short range area of less than about 30 meters ahead of the vehicle. The side and rear short range areas covered by the sensors may be between around 15-20 meters sideward and/or rearward of the vehicle, while the rear long range area may be between about 70-130 meters rearward of the vehicle.

Figure 3:
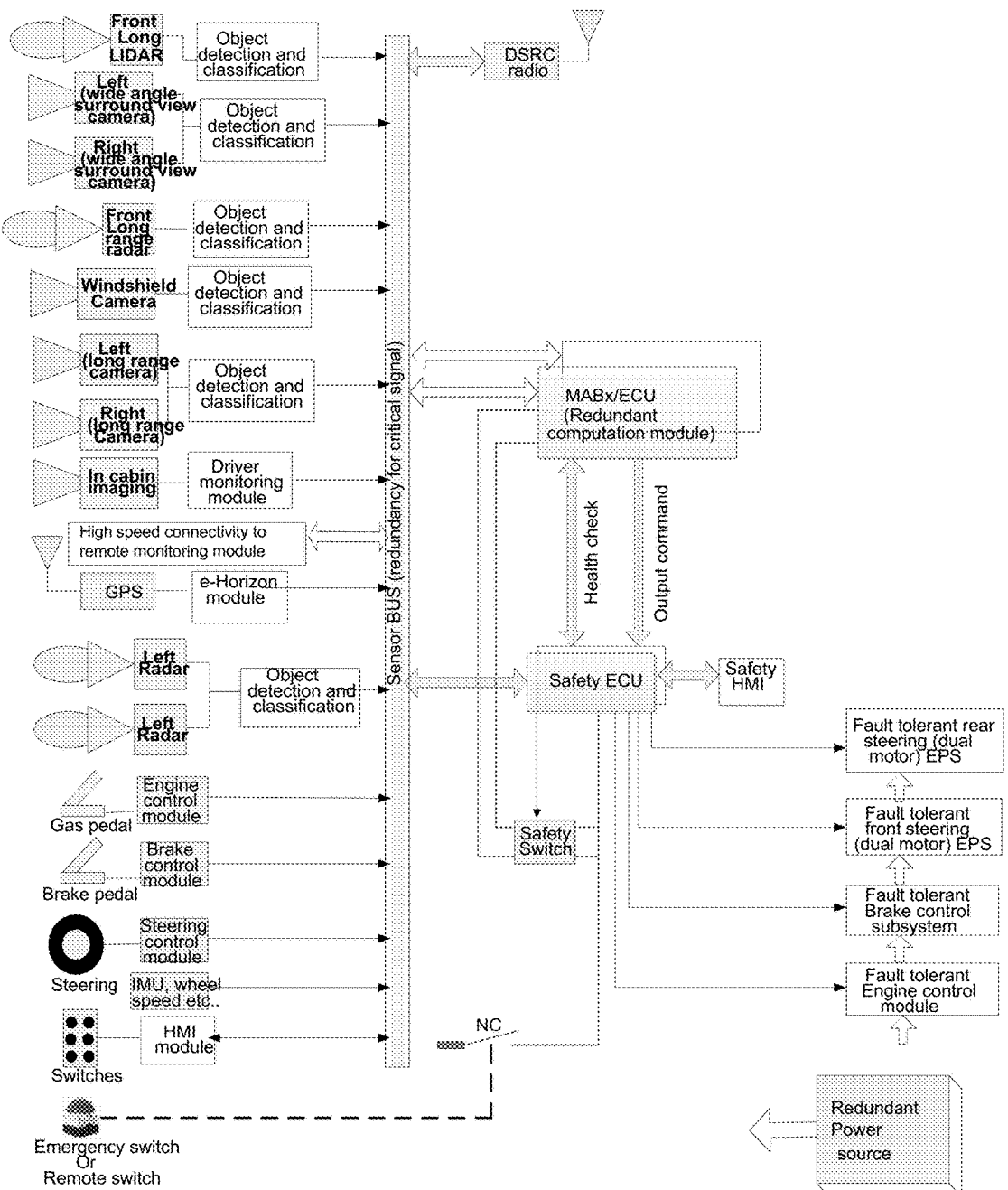
FIG. 3 is a fault tolerant system architecture in accordance with the present invention.

Optionally, and such as shown in FIG. 3, the autonomous vehicle may be equipped with redundant power source to improve the availability of the system. Optionally, the autonomous vehicle may be equipped with a fault tolerant front and rear steering system with dual motor controlled EPS ECU (Electronic Power Steering). When the front steering system is healthy or fully functional, the autonomous controller may use only the front steering system, but in the case of front steering system failure, the autonomous controller detects the failure and, using reconfigurable control structure, starts controlling the rear steering and hence improves the system availability. In applications having a front steering only system, a steering system failure could be handled by the brake system of the vehicle and may to a certain extent improve the availability of the system.

Optionally, the autonomous vehicle may be equipped with redundant computation modules and may be connected to a safety ECU, such as shown in FIG. 3. The redundant safety ECUs monitor the health or operation or functionality of the redundant computation module and control the safety switch to improve the availability of the system.

The system of the present invention monitors the health of computation and safety modules in real-time externally (remote from the vehicle or vehicles), and in the event of a malfunction or failure, actuates or controls the vehicle to minimize the risk of failure. In applications of non-autonomous vehicles, the system may alert the driver of the vehicle or activate the pre-collision preparation system in the vehicle to minimize the damage.

Because of the enhanced computation power to the central processing module (as compared to vehicle-based processors), complex and computational intensive control or monitoring algorithms can be executed in real time to perform the plausibility check and all safety checks of the control output, sensor input and actuator response of the vehicle. Because the central monitoring unit can monitor several vehicles simultaneously, the cost of the vehicle could be kept low because there is no need to install very high computation power hardware in each vehicle.

The vehicle and vehicle sensor system and/or internal monitoring system may utilize one or more cameras or sensors. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014 and published Dec. 24, 2014 as International Publication No. WO 2014/204794, and/or U.S. patent application Ser. No. 14/446,099, filed Aug. 22, 2014 and published Feb. 26, 2015 as U.S. Publication No. US-2015-0054378; Ser. No. 14/377,940, filed Aug. 11, 2014 and published Jan. 22, 2015 as U.S. Publication No. US-2015-0022665; Ser. No. 14/377,939, filed Aug. 11, 2014 and published Jan. 15, 2015 as U.S. Publication No. US-2015-0015713; Ser. No. 14/456,164, filed Aug. 11, 2014 and published Feb. 12, 2015 as U.S. Publication No. US-2015-0042808; Ser. No. 14/456,163, filed Aug. 11, 2014 and published Feb. 12, 2015 as U.S. Publication No. US-2015-0042807; Ser. No. 14/456,162, filed Aug. 11, 2014 and published Feb. 12, 2015 as U.S. Publication No. US-2015-0042806; Ser. No. 14/373,501, filed Jul. 21, 2014 and published Jan. 29, 2015 as U.S. Publication No. US-2015-0028781; Ser. No. 14/372,524, filed Jul. 16, 2014 and published Jan. 22, 2015 as U.S. Publication No. US-2015-0022664; Ser. No. 14/324,696, filed Jul. 7, 2014 and published Jan. 15, 2015 as U.S. Publication No. US-2015-0015710; Ser. No. 14/369,229, filed Jun. 27, 2014, now U.S. Pat. No. 9,491,342; Ser. No. 14/316,940, filed Jun. 27, 2014 and published Jan. 8, 2015 as U.S. Publication No. US-2015-0009010; Ser. No. 14/316,939, filed Jun. 27, 2014 and published Jan. 1, 2015 as U.S. Publication No. US-2015-0002670; Ser. No. 14/303,696, filed Jun. 13, 2014 and published Dec. 25, 2014 as U.S. Publication No. US-2014-0373345; Ser. No. 14/303,695, filed Jun. 13, 2014 and published on Dec. 25, 2014 as U.S. Publication No. US-2014-0375476; Ser. No. 14/303,694, filed Jun. 13, 2014, now U.S. Pat. No. 9,260,095; Ser. No. 14/303,693, filed Jun. 13, 2014 and published Dec. 18, 2014 as U.S. Publication No. US-2014-0368654; Ser. No. 14/297,663, filed Jun. 6, 2014 published Dec. 11, 2014 as U.S. Publication No. US-2014-0362209; Ser. No. 14/362,636, filed Jun. 4, 2014 and published Nov. 13, 2014 as U.S. Publication No. US-2014-0333729; Ser. No. 14/290,028, filed May 29, 2014 and published Dec. 4, 2014 as U.S. Publication No. US-2014-0354811; Ser. No. 14/290,026, filed May 29, 2014, now U.S. Pat. No. 9,476,398; Ser. No. 14/359,341, filed May 20, 2014 and published Nov. 20, 2014 as U.S. Publication No. US-2014-0340510; Ser. No. 14/359,340, filed May 20, 2014 and published Oct. 23, 2014 as U.S. Publication No. US-2014-0313339; Ser. No. 14/282,029, filed May 20, 2014, now U.S. Pat. No. 9,205,776; Ser. No. 14/282,028, filed May 20, 2014 and published Nov. 27, 2014 as U.S. Publication No. US-2014-0347486; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014 and published Oct. 16, 2014 as U.S. Publication No. US-2014-0307095; Ser. No. 14/269,788, filed May 5, 2014 and published Nov. 6, 2014 as U.S. Publication No. US-2014-0327774; Ser. No. 14/268,169, filed May 2, 2014 and published Nov. 6, 2014 as U.S. Publication No. US-2014-0327772; Ser. No. 14/264,443, filed Apr. 29, 2014 and published Oct. 30, 2014 as U.S. Publication No. US-2014-0320636; Ser. No. 14/354,675, filed Apr. 28, 2014 and published Oct. 2, 2014 as U.S. Publication No. US-2014-0293057; Ser. No. 14/248,602, filed Apr. 9, 2014 and published Oct. 16, 2014 as U.S. Publication No. US-2014-0309884; Ser. No. 14/242,038, filed Apr. 1, 2014 and published Aug. 14, 2014 as U.S. Publication No. US-2014-0226012; Ser. No. 14/229,061, filed Mar. 28, 2014 and published Oct. 2, 2014 as U.S. Publication No. US-2014-0293042; Ser. No. 14/343,937, filed Mar. 10, 2014 and published Aug. 21, 2014 as U.S. Publication No. US-2014-0232872; Ser. No. 14/343,936, filed Mar. 10, 2014 and published Aug. 7, 2014 as U.S. Publication No. US-2014-0218535; Ser. No. 14/195,135, filed Mar. 3, 2014 and published Sep. 4, 2014 as U.S. Publication No. US-2014-

0247354; Ser. No. 14/195,136, filed Mar. 3, 2014 and published Sep. 4, 2014 as U.S. Publication No. US-2014-0247355; Ser. No. 14/191,512, filed Feb. 27, 2014 and published Sep. 4, 2014 as U.S. Publication No. US-2014-0247352; Ser. No. 14/183,613, filed Feb. 19, 2014 and published Aug. 21, 2014 as U.S. Publication No. US-2014-0232869; Ser. No. 14/169,329, filed Jan. 31, 2014 and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014 and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. US-2014-0160276; Ser. No. 14/102,980, filed Dec. 11, 2013 and published Jun. 19, 2014 as U.S. Publication No. US-2014-0168437; Ser. No. 14/098,817, filed Dec. 6, 2013 and published Jun. 19, 2014 as U.S. Publication No. US-2014-0168415; Ser. No. 14/097,581, filed Dec. 5, 2013 and published Jun. 12, 2014 as U.S. Publication No. US-2014-0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. US-2014-0152825; Ser. No. 14/082,573, filed Nov. 18, 2013 and published May 22, 2014 as U.S. Publication No. US-2014-0139676; Ser. No. 14/082,574, filed Nov. 18, 2013 and published May 22, 2014 as U.S. Publication No. US-2014-0138140; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US-2014-0104426; Ser. No. 14/046,174, filed Oct. 4, 2013 and published Apr. 10, 2014 as U.S. Publication No. US-2014-0098229; Ser. No. 14/016,790, filed Oct. 3, 2013 and published Mar. 6, 2014 as U.S. Publication No. US-2014-0067206; Ser. No. 14/036,723, filed Sep. 25, 2013, now U.S. Pat. No. 9,446,713; Ser. No. 14/016,790, filed Sep. 3, 2013 and published Mar. 6, 2014 as U.S. Publication No. US-2014-0067206; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013 and published Jan. 23, 2014 as U.S. Publication No. US-2014-0025240; Ser. No. 13/942,753, filed Jul. 16, 2013 and published Jan. 30, 2014 as U.S. Publication No. US-2014-0028852; Ser. No. 13/927,680, filed Jun. 26, 2013 and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. US-2013-0314503; Ser. No. 13/887,724, filed May 6, 2013 and published Nov. 14, 2013 as U.S. Publication No. US-2013-0298866; Ser. No. 13/852,190, filed Mar. 28, 2013 and published Aug. 29, 2013 as U.S. Publication No. US-2013-0222593; Ser. No. 13/851,378, filed Mar. 27, 2013, now U.S. Pat. No. 9,319,637; Ser. No. 13/848,796, filed Mar. 22, 2012 and published Oct. 24, 2013 as U.S. Publication No. US-2013-0278769; Ser. No. 13/847,815, filed Mar. 20, 2013 and published Oct. 31, 2013 as U.S. Publication No. US-2013-0286193; Ser. No. 13/800,697, filed Mar. 13, 2013 and published Oct. 3, 2013 as U.S. Publication No. US-2013-0258077; Ser. No. 13/785,099, filed Mar. 5, 2013 and published Sep. 19, 2013 as U.S. Publication No. US-2013-0242099; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013 and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574, and/or Ser. No. 13/534,657, filed Jun. 27, 2012 and published Jan. 3, 2013 as U.S. Publication No. US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicle monitoring system, said vehicle monitoring system comprising:
a central processor operable to receive data wirelessly communicated to said central processor from multiple vehicles, wherein said central processor is not part of any vehicle of the multiple vehicles;
wherein each of the multiple vehicles is equipped with a plurality of vision sensors and a plurality of non-vision sensors;
wherein said plurality of vision sensors comprises (i) at least one forward viewing camera, (ii) at least one sideward viewing camera and (iii) at least one rearward viewing camera;
wherein said plurality of non-vision sensors comprises at least one of (a) a radar sensor and (b) a LIDAR sensor;
wherein each of the multiple vehicles is equipped with an electronics control unit (ECU);
wherein image data captured by said plurality of vision sensors of each of the multiple vehicles is provided to the ECU of the respective one of the multiple vehicles;
wherein sensor data sensed by said plurality of non-vision sensors of each of the multiple vehicles is provided to the ECU of the respective one of the multiple vehicles;
wherein image data and sensor data provided to the ECU of each of the multiple vehicles is processed at that ECU to detect and classify objects external to the respective one of the multiple vehicles;
wherein the respective ECU wirelessly communicates (i) vehicle data indicative of operation of the respective one of the multiple vehicles and (ii) environment data indicative of the environment in which the respective one of the multiple vehicles is traveling;
wherein said central processor is operable to wirelessly receive, from each of the multiple vehicles, the respective vehicle data indicative of operation of the respective one of the multiple vehicles and the respective environment data indicative of the environment in which the respective one of the multiple vehicles is operating;
wherein, responsive to vehicle data and environment data wirelessly received at said central processor from the multiple vehicles, said central processor determines if one or more of the multiple vehicles is at or approaching a hazardous condition; and
wherein, responsive to the determination that one or more of the multiple vehicles is a threatened vehicle at a potentially hazardous condition, said central monitoring system at least one of (i) actuates an alert of the threatened vehicle to alert a driver of the threatened vehicle of the determined hazardous condition and (ii) controls a vehicle system of the threatened vehicle to mitigate the determined hazardous condition.

2. The vehicle monitoring system of claim 1, wherein at least some of the multiple vehicles are equipped with a GPS-enabled e-Horizon.

3. The vehicle monitoring system of claim 2, wherein each of the multiple vehicles is a semi-autonomous vehicle.

4. The vehicle monitoring system of claim 2, wherein the GPS-enabled e-Horizon of the respective vehicle provides to the respective vehicle environment data related to at least one of (i) a speed limit, (ii) an exit ramp location, (iii) an entry ramp location, (iv) road curvature information and (v) lanes.

5. The vehicle monitoring system of claim 1, wherein, responsive to the determination that one or more of the multiple vehicles is a threatened vehicle at a potentially hazardous condition, said central monitoring system actuates an alert of the threatened vehicle to alert a driver of the threatened vehicle of the determined hazardous condition.

6. The vehicle monitoring system of claim 1, wherein, responsive to the determination that one or more of the multiple vehicles is a threatened vehicle at a potentially hazardous condition, said central monitoring system controls a vehicle system of the threatened vehicle to mitigate the determined hazardous condition.

7. The vehicle monitoring system of claim 6, wherein said vehicle system comprises at least one of (i) a brake system, (ii) a steering system, (iii) a torque control and (iv) a collision avoidance system.

8. The vehicle monitoring system of claim 1, wherein the environment data comprises at least one of (i) map information, (ii) traffic information and (iii) weather condition information.

9. The vehicle monitoring system of claim 1, wherein the vehicle data comprises at least one of (i) vehicle longitudinal velocity, (ii) vehicle lateral velocity, (iii) vehicle longitudinal acceleration, (iv) vehicle lateral acceleration and (v) actuation of a turn signal indicator of the respective vehicle.

10. The vehicle monitoring system of claim 1, wherein each of the multiple vehicles includes a vehicle-to-infrastructure communication system that is operable to communicate data to said central processor.

11. The vehicle monitoring system of claim 1, wherein at least one of the multiple vehicles comprises a semi-autonomous vehicle.

12. The vehicle monitoring system of claim 11, wherein, responsive to a determination that the semi-autonomous vehicle is a threatened vehicle at a potentially hazardous condition, said central monitoring system controls at least one vehicle system of the semi-autonomous threatened vehicle to mitigate the determined hazardous condition.

13. A vehicle monitoring system, said vehicle monitoring system comprising:
a central processor operable to receive data wirelessly communicated to said central processor from multiple vehicles, wherein said central processor is not part of any vehicle of the multiple vehicles;
wherein each of the multiple vehicles is equipped with a plurality of vision sensors and a plurality of non-vision sensors;
wherein said plurality of vision sensors of each of the multiple vehicles comprises (i) at least one forward viewing camera viewing exterior the respective one of the multiple vehicles through a windshield of that vehicle, (ii) at least one sideward viewing camera mounted at a left side portion of the respective one of the multiple vehicles and at least one sideward viewing camera mounted at a right side portion of the respective one of the multiple vehicles and (iii) at least one rearward viewing camera mounted at a rear portion of the respective one of the multiple vehicles;
wherein said plurality of non-vision sensors of each of the multiple vehicles comprises at least (a) a radar sensor mounted at a left side portion of the respective one of the multiple vehicles, (b) a radar sensor mounted at a right side portion of the respective one of the multiple vehicles and (c) a radar sensor mounted at a front portion of the respective one of the multiple vehicles;
wherein each of the multiple vehicles is equipped with an electronics control unit (ECU);
wherein image data captured by said plurality of vision sensors of each of the multiple vehicles is provided to the ECU of the respective one of the multiple vehicles;

wherein sensor data sensed by said plurality of non-vision sensors of each of the multiple vehicles is provided to the ECU of the respective one of the multiple vehicles;

wherein image data and sensor data provided to the ECU of each of the multiple vehicles is processed at that ECU to detect and classify objects external to the respective one of the multiple vehicles;

wherein the respective ECU wirelessly communicates (i) vehicle data indicative of operation of the respective one of the multiple vehicles and (ii) environment data indicative of the environment in which the respective one of the multiple vehicles is traveling;

wherein said central processor is operable to wirelessly receive, from each of the multiple vehicles, the respective vehicle data indicative of operation of the respective one of the multiple vehicles and the respective environment data indicative of the environment in which the respective one of the multiple vehicles is operating;

wherein, responsive to vehicle data and environment data wirelessly received at said central processor from the multiple vehicles, said central processor determines if one or more of the multiple vehicles is at or approaching a hazardous condition;

wherein the environment data comprises at least one of (i) map information, (ii) traffic information and (iii) weather condition information; and wherein the vehicle data comprises at least one of (i) vehicle longitudinal velocity, (ii) vehicle lateral velocity, (iii) vehicle longitudinal acceleration, (iv) vehicle lateral acceleration and (v) actuation of a turn signal indicator of the respective vehicle.

14. The vehicle monitoring system of claim 13, wherein, responsive to the determination that one or more of the multiple vehicles is a threatened vehicle at a potentially hazardous condition, said central monitoring system actuates an alert of the threatened vehicle to alert a driver of the threatened vehicle of the determined hazardous condition.

15. The vehicle monitoring system of claim 13, wherein, responsive to the determination that one or more of the multiple vehicles is a threatened vehicle at a potentially hazardous condition, said central monitoring system controls a vehicle system of the threatened vehicle to mitigate the determined hazardous condition.

16. The vehicle monitoring system of claim 15, wherein said vehicle system comprises at least one of (i) a brake system, (ii) a steering system, (iii) a torque control and (iv) a collision avoidance system.

17. The vehicle monitoring system of claim 13, wherein each of the multiple vehicles includes a vehicle-to-infrastructure communication system that is operable to communicate data to said central processor and wherein at least one of the multiple vehicles comprises a semi-autonomous vehicle.

18. The vehicle monitoring system of claim 13, wherein at least some of the multiple vehicles are equipped with a GPS-enabled e-Horizon, and wherein the GPS-enabled e-Horizon of the respective vehicle provides to the respective vehicle environment data related to at least one of (i) a speed limit, (ii) an exit ramp location, (iii) an entry ramp location, (iv) road curvature information and (v) lanes.

19. A vehicle monitoring system, said vehicle monitoring system comprising:

a central processor operable to receive data wirelessly communicated to said central processor from multiple vehicles, wherein said central processor is not part of any vehicle of the multiple vehicles;

wherein each of the multiple vehicles is equipped with a plurality of vision sensors and a plurality of non-vision sensors;

wherein said plurality of vision sensors of each of the multiple vehicles comprises (i) at least one forward viewing camera viewing exterior the respective one of the multiple vehicles through a windshield of that vehicle, (ii) at least one sideward viewing camera mounted at a left side portion of the respective one of the multiple vehicles and at least one sideward viewing camera mounted at a right side portion of the respective one of the multiple vehicles and (iii) at least one rearward viewing camera mounted at a rear portion of the respective one of the multiple vehicles;

wherein said plurality of non-vision sensors of each of the multiple vehicles comprises at least (a) a radar sensor mounted at a left side portion of the respective one of the multiple vehicles, (b) a radar sensor mounted at a right side portion of the respective one of the multiple vehicles and (c) a radar sensor mounted at a front portion of the respective one of the multiple vehicles;

wherein at least some of the multiple vehicles are equipped with a GPS-enabled e-Horizon;

wherein each of the multiple vehicles is equipped with an electronics control unit (ECU);

wherein image data captured by said plurality of vision sensors of each of the multiple vehicles is provided to the ECU of the respective one of the multiple vehicles;

wherein sensor data sensed by said plurality of non-vision sensors of each of the multiple vehicles is provided to the ECU of the respective one of the multiple vehicles;

wherein image data and sensor data provided to the ECU of each of the multiple vehicles is processed at that ECU to detect and classify objects external to the respective one of the multiple vehicles;

wherein the respective ECU wirelessly communicates (i) vehicle data indicative of operation of the respective one of the multiple vehicles and (ii) environment data indicative of the environment in which the respective one of the multiple vehicles is traveling;

wherein said central processor is operable to wirelessly receive, from each of the multiple vehicles, the respective vehicle data indicative of operation of the respective one of the multiple vehicles and the respective environment data indicative of the environment in which the respective one of the multiple vehicles is operating;

wherein, responsive to vehicle data and environment data wirelessly received at said central processor from the multiple vehicles, said central processor determines if one or more of the multiple vehicles is at or approaching a hazardous condition;

wherein the environment data comprises at least one of (i) map information, (ii) traffic information and (iii) weather condition information; and wherein the vehicle data comprises at least one of (i) vehicle longitudinal velocity, (ii) vehicle lateral velocity, (iii) vehicle longitudinal acceleration, (iv) vehicle lateral acceleration and (v) actuation of a turn signal indicator of the respective vehicle.

20. The vehicle monitoring system of claim 19, wherein said plurality of non-vision sensors comprises a LIDAR sensor.

21. The vehicle monitoring system of claim 20, wherein, responsive to the determination that one or more of the multiple vehicles is a threatened vehicle at a potentially hazardous condition, said central monitoring system actuates an alert of the threatened vehicle to alert a driver of the threatened vehicle of the determined hazardous condition.

22. The vehicle monitoring system of claim 20, wherein, responsive to the determination that one or more of the multiple vehicles is a threatened vehicle at a potentially hazardous condition, said central monitoring system controls a vehicle system of the threatened vehicle to mitigate the determined hazardous condition.

23. The vehicle monitoring system of claim 22, wherein said vehicle system comprises at least one of (i) a brake system, (ii) a steering system, (iii) a torque control and (iv) a collision avoidance system.

24. The vehicle monitoring system of claim 20, wherein each of the multiple vehicles includes a vehicle-to-infrastructure communication system that is operable to communicate data to said central processor and wherein at least one of the multiple vehicles comprises a semi-autonomous vehicle.

25. The vehicle monitoring system of claim 20, wherein the GPS-enabled e-Horizon of the respective vehicle provides to the respective vehicle environment data related to at least one of (i) a speed limit, (ii) an exit ramp location, (iii) an entry ramp location, (iv) road curvature information and (v) lanes.

\* \* \* \* \*

UNITED STATES PATENT AND TRADEMARK OFFICE
CERTIFICATE OF CORRECTION

PATENT NO. : 10,137,892 B2
APPLICATION NO. : 15/355436
DATED : November 27, 2018
INVENTOR(S) : Krishna Koravadi It is certified that error appears in the above-identified patent and that said Letters Patent is hereby corrected as shown below:

In the Specification

Column 2
Lines 37-38, "US 2012-0002743" should be --US 2012-0062743--

Signed and Sealed this
Twenty-ninth Day of January, 2019

Andrei Iancu
*Director of the United States Patent and Trademark Office*